(12) United States Patent
Costa

(10) Patent No.: US 10,774,861 B2
(45) Date of Patent: Sep. 15, 2020

(54) MOUNTING SYSTEM APPLIED TO CABINETS WITH FEET

(71) Applicant: ITATIAIA MÓVEIS S/A, Ubá (BR)

(72) Inventor: Victor Penna Costa, Nova Lima (BR)

(73) Assignee: ITATIAIA MÓVEIS S/A, Ubá (BR)

( * ) Notice: Subject to any disclaimer, the term of this patent is extended or adjusted under 35 U.S.C. 154(b) by 0 days.

(21) Appl. No.: 16/287,736

(22) Filed: Feb. 27, 2019

(65) Prior Publication Data

US 2020/0109732 A1 Apr. 9, 2020

(30) Foreign Application Priority Data

Oct. 9, 2018 (BR) .............................. 202018070765

(51) Int. Cl.
| | | |
|---|---|---|
| *F16B 12/52* | (2006.01) | |
| *F16B 12/08* | (2006.01) | |
| *A47B 91/00* | (2006.01) | |
| *A47B 47/00* | (2006.01) | |

(52) U.S. Cl.
CPC .......... *F16B 12/52* (2013.01); *A47B 47/0075* (2013.01); *A47B 91/00* (2013.01); *F16B 12/08* (2013.01); *A47B 2220/0052* (2013.01)

(58) Field of Classification Search
CPC . A47B 47/00; A47B 47/0066; A47B 47/0075; A47B 47/02; A47B 47/025; A47B 55/00; A47B 91/00; A47B 91/005; A47B 96/20; A47B 96/201; A47B 2220/0027; A47B 2220/0052; A47B 2220/0058; A47B 2230/16; F16B 12/52
See application file for complete search history.

(56) References Cited

U.S. PATENT DOCUMENTS

| | | | | |
|---|---|---|---|---|
| 2,727,800 | A * | 12/1955 | Snider ..................... | A47B 61/00 312/263 |
| 3,572,872 | A * | 3/1971 | Fenwick ................ | A47B 13/06 312/263 |
| 4,462,647 | A * | 7/1984 | Key ........................ | A47B 47/03 312/108 |
| 5,221,131 | A * | 6/1993 | Lesperance .......... | A47B 47/025 312/263 |
| 6,099,095 | A * | 8/2000 | Irace ....................... | F16B 12/28 220/4.01 |
| 6,789,859 | B1 * | 9/2004 | Ho ......................... | A47B 47/02 312/257.1 |
| 2017/0282349 | A1 * | 10/2017 | Zhao ....................... | B25H 3/00 |

FOREIGN PATENT DOCUMENTS

| | | | | | |
|---|---|---|---|---|---|
| DE | 2757304 | A1 * | 7/1979 | ............. | A47B 63/00 |
| DE | 29713319 | U1 * | 11/1997 | ............. | A47B 47/00 |
| FR | 2584585 | A1 * | 1/1987 | ........... | A47B 13/021 |
| FR | 2850259 | A1 * | 7/2004 | ............. | A47B 13/06 |

* cited by examiner

*Primary Examiner* — Andrew M Roersma
(74) *Attorney, Agent, or Firm* — Brinks Gilson & Lione

(57) ABSTRACT

The present disclosure is applied to the area of furniture, and is related to a quick-mounting system applied to a cabinet body including the feet, preferably steel cabinets, for joining the unmounted pieces by fittings and bends on the steel piece itself that is locked between the pieces with no need of screws, connectors, tools or skilled labor.

8 Claims, 10 Drawing Sheets

MOUNTING SYSTEM APPLIED TO CABINETS WITH FEET

TECHNICAL FIELD

The present disclosure relates to furniture.

BRIEF SUMMARY OF THE INVENTION

One general aspect of the present disclosure includes a mounting system for cabinets with feet including: a left side panel having a first U-shaped bend over a forward surface of the panel with a tab in the bend; and a rear support structure welded in an H-shape having a first tubular foot and a second tubular foot, each foot having a square cross-section and having a hole in the foot, where the first tubular foot of the rear support structure is received within the first bend of the left side panel such that the hole is aligned with the tab, and is locked in position by the tab being bent into the hole in the first tubular foot.

BRIEF DESCRIPTION OF THE DRAWINGS

The system described in the present embodiments may be viewed in the appended Figures, where.

DETAILED DESCRIPTION

Figure 1:
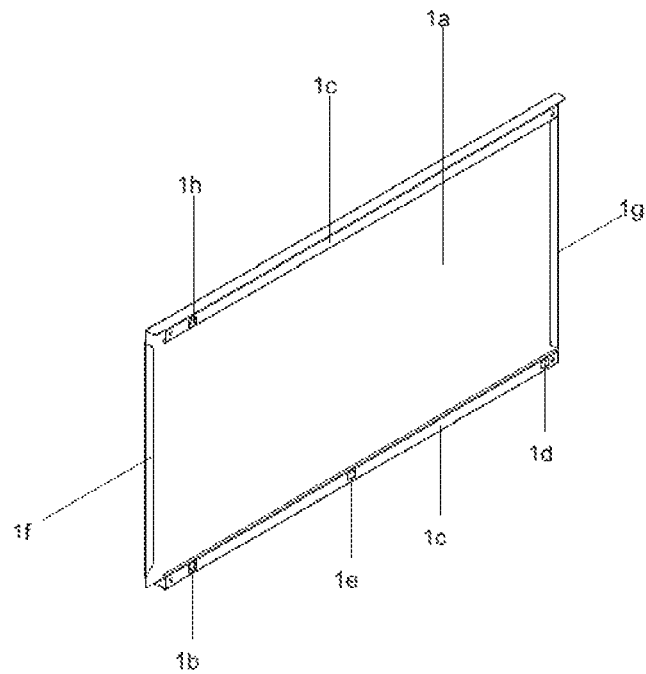
FIG. 1 illustrates the left side section view of the cabinet.

The present disclosure is applied to the area of furniture, and is related to a quickly mounting system applied to a cabinet body including the feet, specifically steel cabinets, for joining the unmounted pieces by fittings and bends on the steel piece itself that is locked between the pieces with no need of screws, connectors, tools or skilled labor.

The cabinet presents double tubular rear and front feet in square section welded in H-shape which are attached to the body sides of the steel cabinet by bends in their ends forming the exact cradle to receive the H-shaped tube of the feet. The back part of the left and right sides are fitted one to another, and then, to the leading part of the left and right sides. After fitting the rear and front feet, they are locked one to another by simple manual bends on the cradles receiving the tubular feet. The feet being fitted and locked in the sides, and the back section of the cabinet (back) being mounted, which will be able to be bipartite or a single piece.

The back section being bipartite, the first part is placed resting on the rear bends of the side parts and on the tubular foot, and then they are locked by simple manual bends on the side parts. The second part of the bipartite back section rests on the rear bends of the side parts and on the first part of the bipartite back, and then they are locked by simple manual bends on the side parts and on the joint of both bipartite backs. After mounting the back section, the base of the cabinet may be placed by fitting the tabs bent to 90° of the side part of the base to the tabs of the cabinet left and right sides bent to 180°. Then, the steel top is placed by sliding the side bends of the top between the bends of the left and right sides, thus forming the steel cabinet already mounted with the feet. This cabinet with no locks on the top yet receives two simple manual bends on its rear inner part, on the steel between the top and the upper part of the back section, forming the box of the cabinet, which is structured for the shelves and doors to be fitted to it.

The mounting systems currently used for mounting the box of cabinets using unmounted steel sheets, specifically on the back sections, are attached by joining the side sections, top and base with the back, the side sections, top, and base having bends that, being with the flat sheet of the back, are joined using screws and nuts passing through matching bores. In another known system, the back presents a recess made by the bend that meets the side sections, top, and base of the cabinet, having U-shaped bends on the rear side, and are attached using screws and nuts or self-tapping screw through matching bores.

In turn, the systems currently used for cabinet installation on a wall usually utilize a device which is attached to the rear part of the back section of the cabinet box, being fitted to a recessed panel to be fitted on the wall, or may be attached to the wall through bores on the back that are positioned in the installation site, and attached using screw and bush.

The Brazilian document No. BR 102014016208-9, entitled "SISTEMA CONSTRUTIVO DE MONTAGEM APLICADO EM ARMÁRIO" (CONSTRUCTIVE SYSTEM OF MOUNTING APPLIED TO CABINET), consists of a wooden cabinet composed of two side sheets, a top, a fixed middle shelf, a base sheet, a back sheet, a double-sheet door, provided with detachable shelves, finishing bungs and supporting bungs, threaded feet, screws, bulkhead sheet, and handles. The novelty consists of the fact of being provided with ridged sheets, or holes designed to bends and lockings, reducing the attaching using screws, and eliminating welding. It differs from the present system for presenting wooden finishes and sheets, and for the fittings and lockings being screwed, while the embodiments herein described presents quickly mounting system through pieces of steel sheets having fittings and bends on the steel piece itself.

The Brazilian document No. PI 0603865-4, the Applicant of the present disclosure being its owner, is a MOUNTING SYSTEM OF CABINET WITH AN ATTACHING ELEMENT ("SISTEMA DE MONTAGEM DE ARMÁRIO COM ELEMENTO DE FIXAÇÃO") that presents a structured assembly of pieces shaped in stamp or bent steel, the shape and scale substantially corresponding to the fitting one to another, which will occur concurrently, at the moment of mounting, successively, through coupling, by means of a common attaching element. The side profiles are provided with an U-shaped bend, apertures for fitting the attaching element, in addition to apertures for fitting the back face; central faces or tops. The side profiles are provided with holes for coupling the U-shaped sides, aperture for fitting the pin of the attaching element, and matching aperture for juxtapositioning the aperture of the attaching element; attaching element of the body provided with a pin on the base, in addition to apertures and fitting for receiving a hinge and a screw, allowing the hinge of the door to be attached. After the door receiving the fitting of the hinge, this fitting is coupled to the attaching element by the fitting, and attached by threading the screw into the aperture, through the fitting of the hinge. It differs from the present system due to the fixation of the pieces, and the fixation of the cabinet on the wall is through screws, attaching pins and elements, while the embodiments herein described presents quickly mounting system through pieces of steel sheets having fittings and bends on the steel itself, dismissing screws, connectors, tools or skilled labor.

The Brazilian document No. MU 8903064-8, entitled "DISPOSIÇÃO CONSTRUTIVA INTRODUZIDA EM DISPOSITIVOS DE MONTAGEM E FIXAÇÃO DE PARTES COMPONENTES DE ARMÁRIO METALICO" (CONSTRUCTIVE ARRANGEMENT INTRODUCED IN MOUNTING DEVICES AND ATTACHING OF PARTS OF METALLIC CABINET COMPONETS), presents a mounting and attaching device of the couple of pieces composing the bottom; mounting and attaching device of the pieces composing the side parts together with the upper crossbar; mounting and attaching device of the shelves together with the assembly of racks, and mounting and attaching device of the back part composing the top, right and left bottom pieces, the rack piece; the shelf piece, and the top piece. It differs from the present system for presenting locking bar, crossbar, and extruded column supporting the frame of the cabinet, while the present embodiments do not have structural pieces, only pieces of steel sheets with fittings and bends on the steel sheet itself, dismissing screws, connectors, tools or skilled labor.

The mounting system of the steel cabinet box described in the present disclosure consists of loose pieces on steel sheets having predefined bends forming the parts of the back section, the side sections, the top, and the base, in addition to double tubular feet of the square section welded in the H-shape, that, through simple fittings between them, they form the cabinet box with feet, with no shelves and doors yet. This box is shaped by fitted parts, predefined mounting parts, receiving the locking by simple manual bends on the steel sheet. These bends are made without the need of tools, allowing for a quick, simplified mounting, that can be made by any person, and easy of understanding, thus forming the box of the steel cabinet locked, and rigid enough to receive, if needed, shelves and doors.

The present disclosure presents the following advantages:
  allowing for a quick and safe mounting of components, by fitting and simply bending the parts;
  enabling to lock the pieces of the cabinet box in an effective and resistant manner;
  providing fittings by bending the steel sheet itself;
  allowing the body of the cabinet to be mounted without the need of connectors, screws, and specific tools;
  enabling the mounting of the cabinet body to be made by only one person, and needing no skilled professional.

Figure 2:
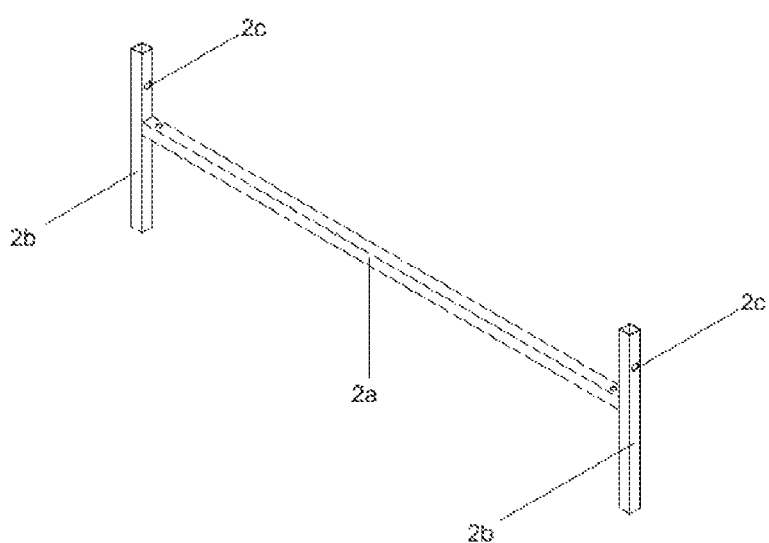
FIG. 2 illustrates the view of the double tubular feet in square section, welded in H-shape, both forward and rearward.
Figure 3:
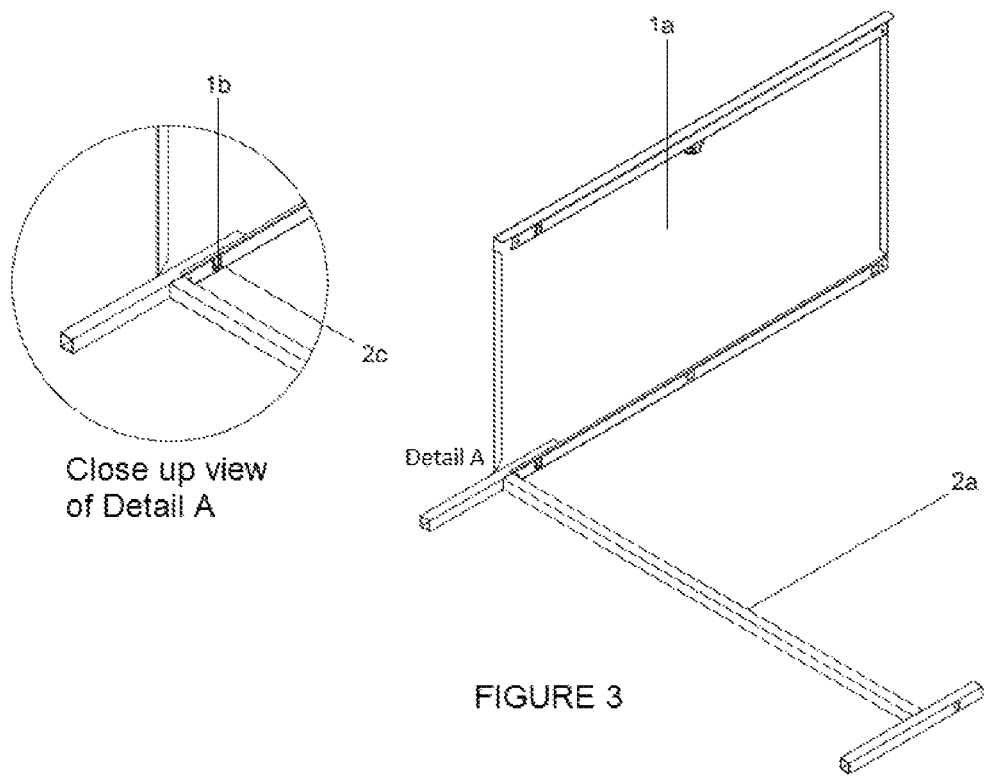
FIG. 3 illustrates the view of the left side section assembly, and double rear tubular feet in square section welded in H-shape. The close-up view A illustrates the fitting and the locking of the pieces of the left side pieces, and double rear tubular feet.

According to the FIGS. 1, 2, and 3, the left side (1a) composed of U-shaped bends (1c) receives the double tubular rear feet (2a) in square section welded in H-shape on its forward part of the left side (2b) by fitting them to the bends of the side part (1c) being locked by manually bending the tab (1b) on the hole (2c) of the foot.

Figure 4:
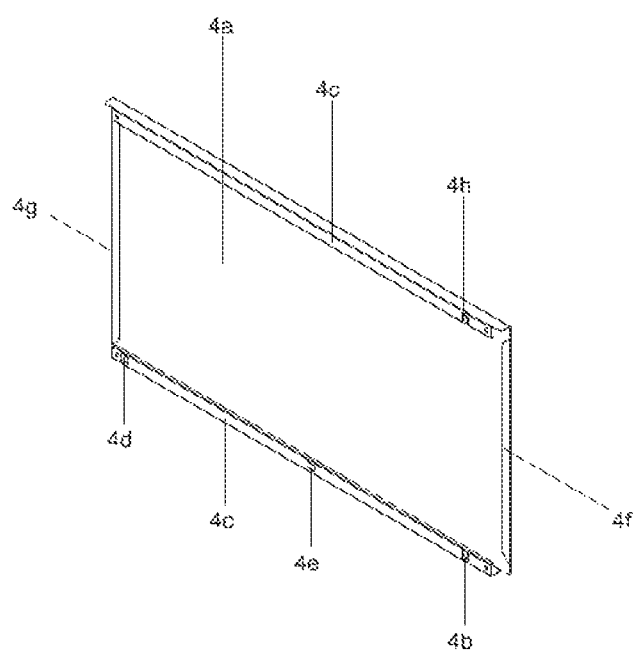
FIG. 4 illustrates the right section view of the cabinet.
Figure 5:
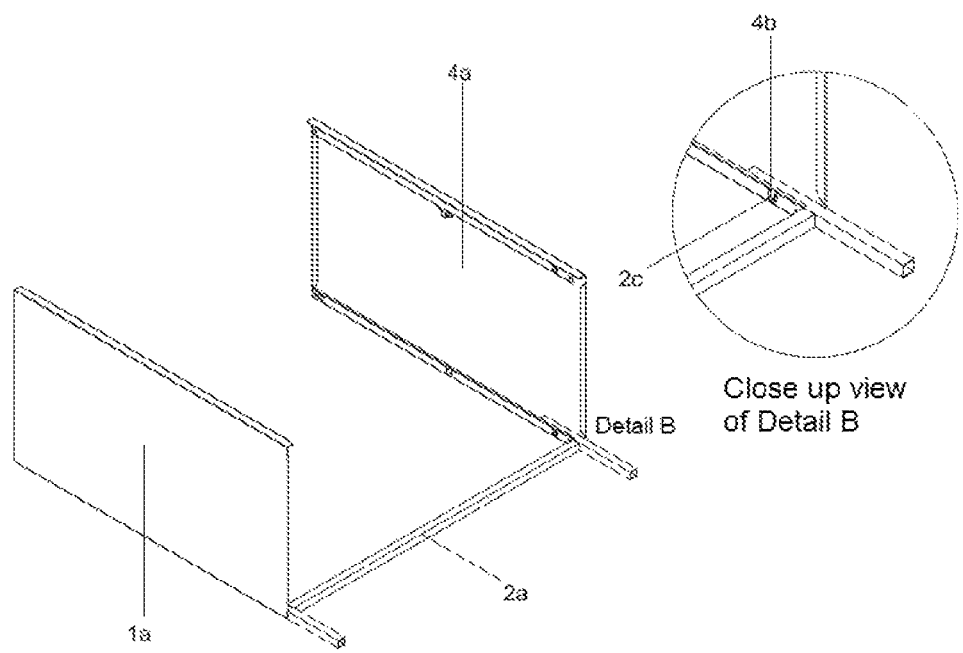
FIG. 5 illustrates the view of the left and right sides of the section assembly, and double rear tubular feet in square section welded in H-shape. The close-up view B illustrates the fitting and locking of the right side pieces, and double rear tubular feet.

According to the FIGS. 2, 4, and 5, the right side (4a) composed of U-shaped bends (4c) receives the double tubular rear feet (2a) in square section welded in H-shape on its forward part of the right side (2b) by fitting them to the bends (4c) of the side part being locked by manually bending the tab (4b) on the hole (2c) of the foot.

Figure 6:
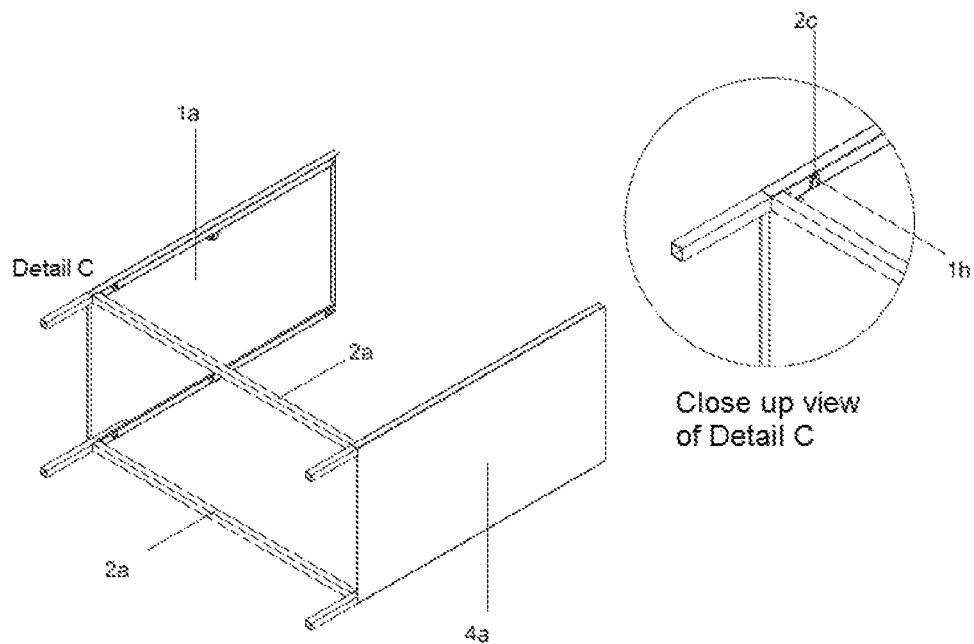
FIG. 6 illustrates the view of the left and right sides of the section assembly, and double rear and front tubular feet in square section welded in H-shape. The close-up view C illustrates the fitting and the locking of the left side pieces, and double front tubular feet.
Figure 7:
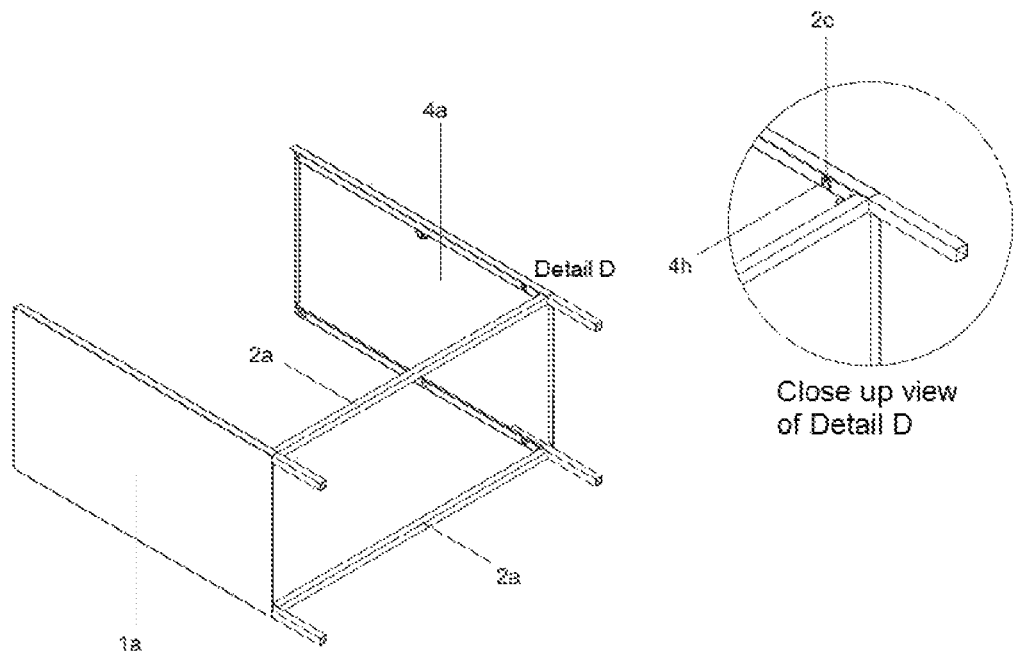
FIG. 7 illustrates the view of the left and right sides of the section assembly, and double rear and front tubular feet in square section welded in H-shape. The close-up view D illustrates the fitting and locking of the right side pieces, and double front tubular feet.
Figure 8:
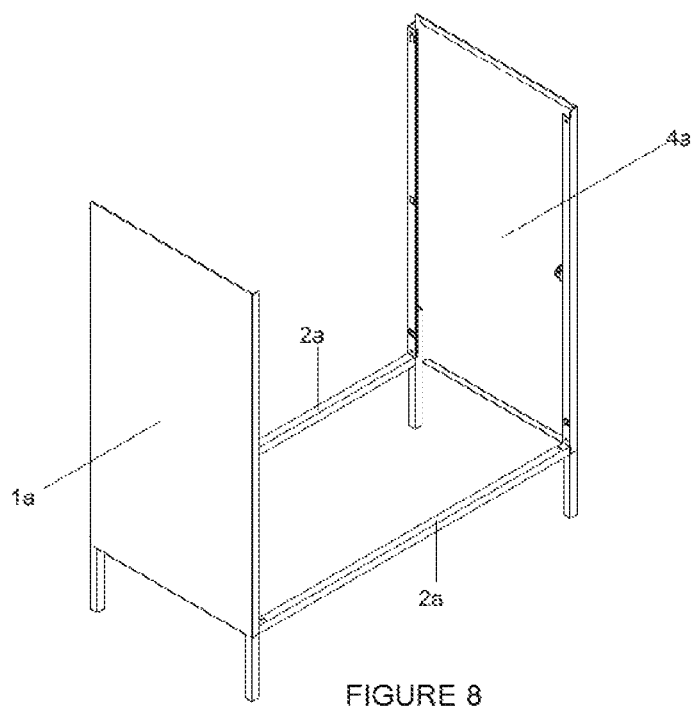
FIG. 8 illustrates the view of the mounted assembly with left and right sides, and rear and front feet.

According to the FIGS. 1, 2, and 6, the left side (1a) composed of U-shaped bends (1c) receives the double tubular front feet (2a) in square section welded in H-shape on its forward part of the left side (2b) by fitting them to the bends of the side part (1c) being locked by manually bending the tab (1h) on the hole (2c) of the foot.

According to the FIGS. 2, 4, 7, and 8, the right side (4a) composed of U-shaped bends (4c) receives the double tubular front feet (2a) in square section welded in H-shape on its forward part of the right side (2b) by fitting them to the bends (4c) of the side part being locked by manually bending the tab (4h) on the hole (2c) of the foot. After the locking, the cabinet with feet is placed upright (8).

Figure 9:
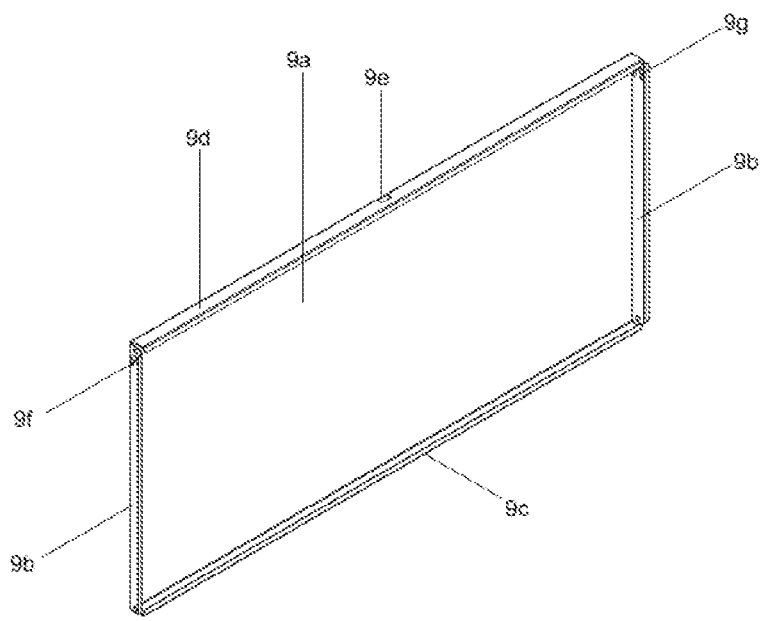
FIG. 9 illustrates the view of the lower part of the back section of the cabinet.
Figure 10:
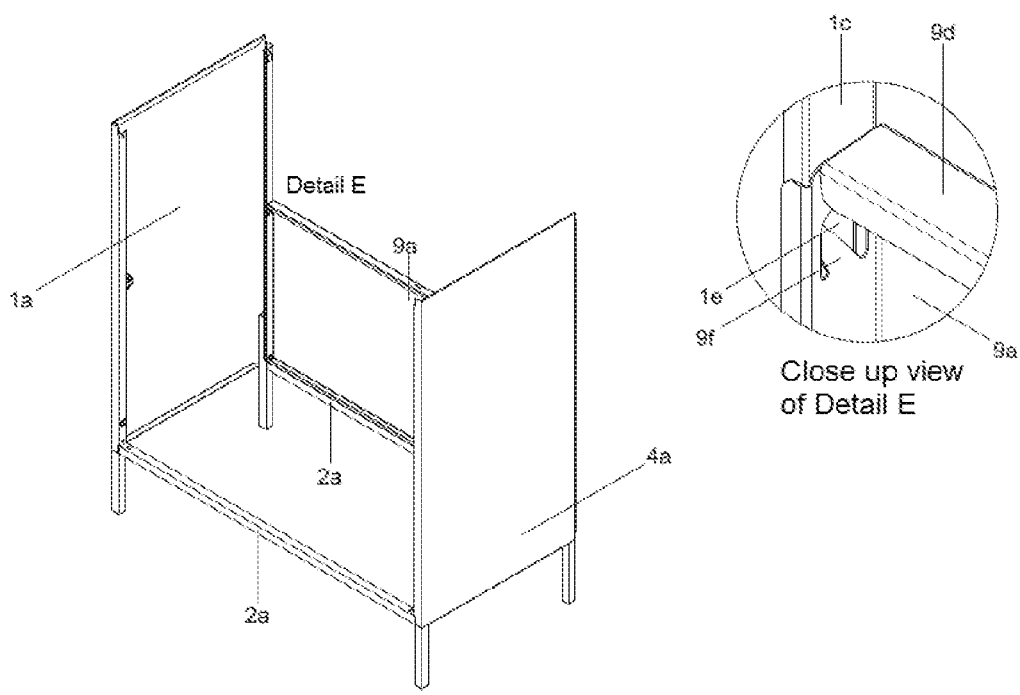
FIG. 10 illustrates the view of the mounted assembly with the left and right sides, rear and front feet, and the lower part of the back section. The close-up view E illustrates the left side locking fitting between the side part and the lower part of the back section.
Figure 11:
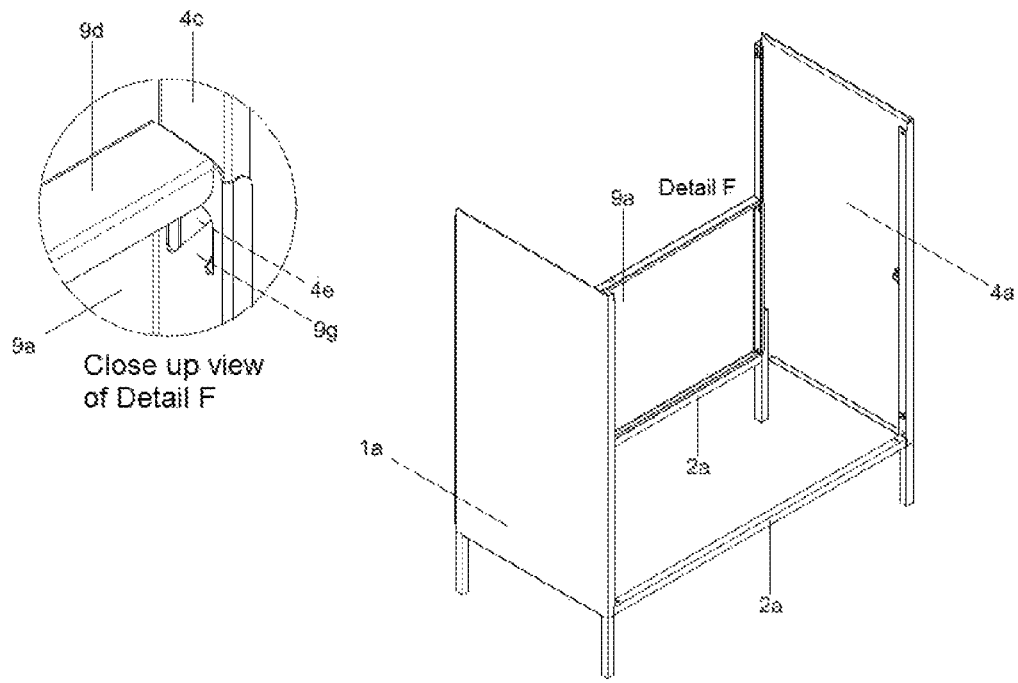
FIG. 11 illustrates the view of the mounted assembly with the left and right sides, rear and front feet, and the lower part of the back section. The close-up view F illustrates the right side locking fitting between the side part and the lower part of the back section.

According to the FIGS. 9, 10, and 11, the mounted assembly of the side parts, and rear and front feet (8) receives the lower part of the back section of the cabinet (9a) by simply fitting it over the U-shaped bend (1c and 4c), and over the rear foot (2a), receiving the locking of the assembly by manually bending the tab (9f and 9g) into the holes (1e and 4e) of the left and right sides.

Figure 12:
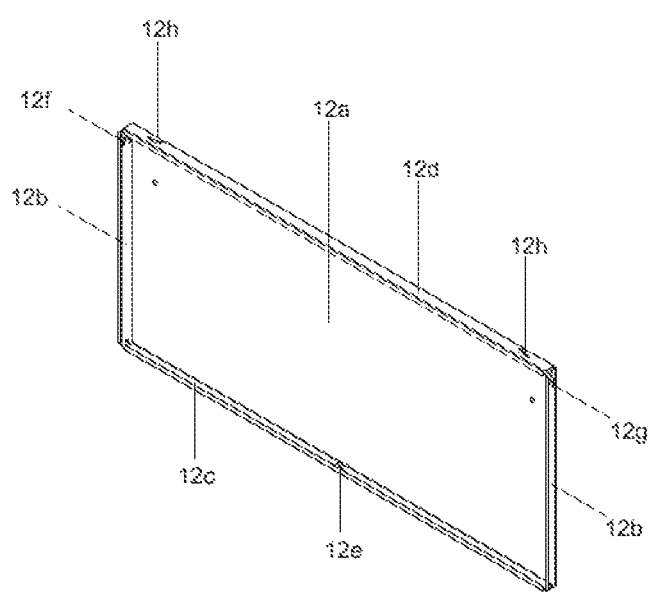
FIG. 12 illustrates the view of the upper part of the back section of the cabinet.
Figure 13:
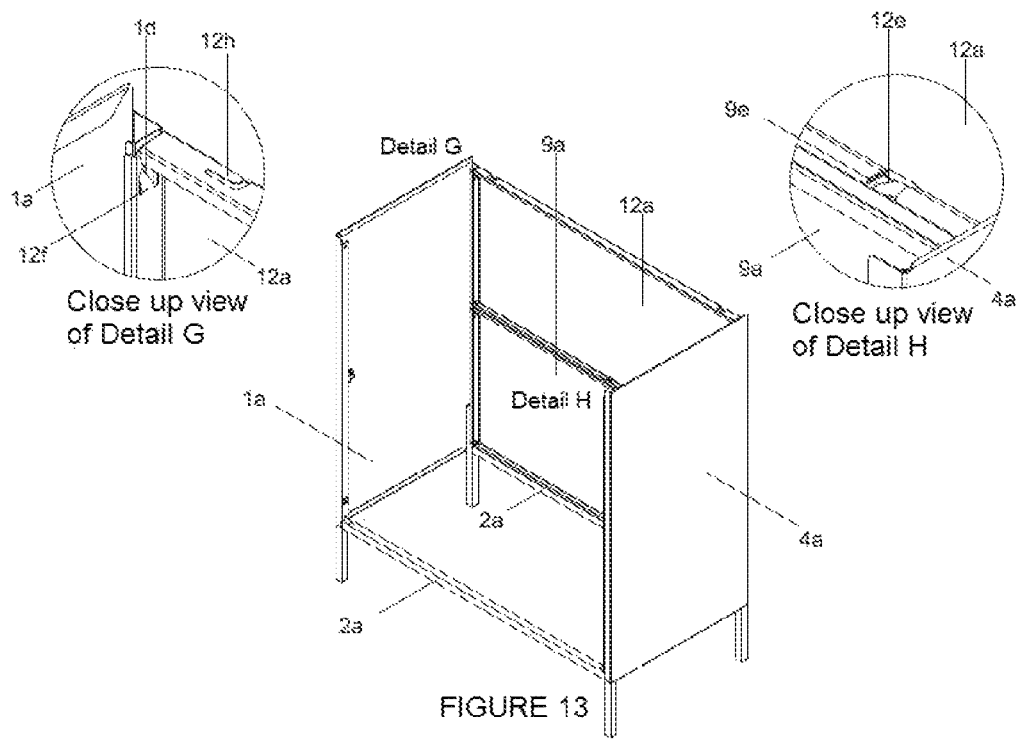
FIG. 13 illustrates the view of the mounted assembly with the left and right sides, rear and front feet, and the lower and upper parts of the back section. The close-up view G illustrates the left side locking between the side part and the upper part of the back section. The close-up view H illustrates the intersection between lower and upper parts of the back section, and the locking between them.
Figure 14:
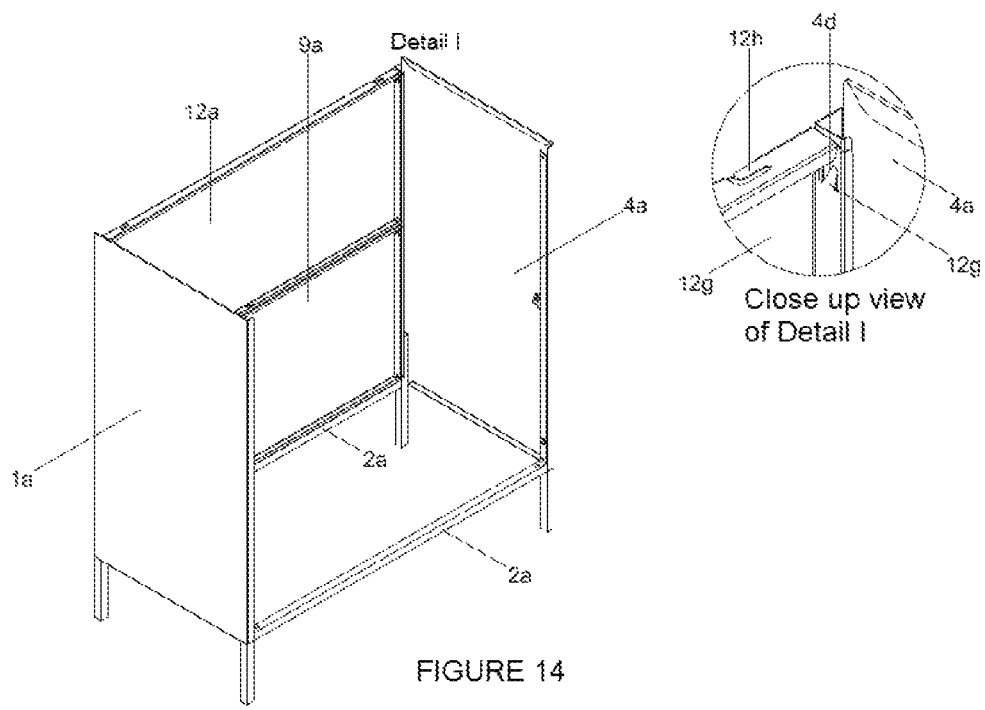
FIG. 14 illustrates the view of the mounted assembly with the left and right sides, rear and front feet, and the lower and upper parts of the back section. The close-up view I illustrates the right side locking between the side part and the upper part of the back section.

According to the FIGS. 12, 13, and 14, the mounted assembly of the side sections, feet, and the lower part of the back section of the cabinet (11) receives the upper part of the back section of the cabinet (12a) by simply fitting it over the U-shaped bend (1c and 4c), receiving the locking of the assembly by manually bending the tab (12f and 12g) into the holes (1d and 4d) of the left and right sides. Still, for fully locking the pieces, the upper part of the back section of the cabinet (12a), by manually bending the tab (12e) on the hole (9e) of the lower part of the back section of the cabinet (9a), finishes the locking of the pieces.

Figure 15:
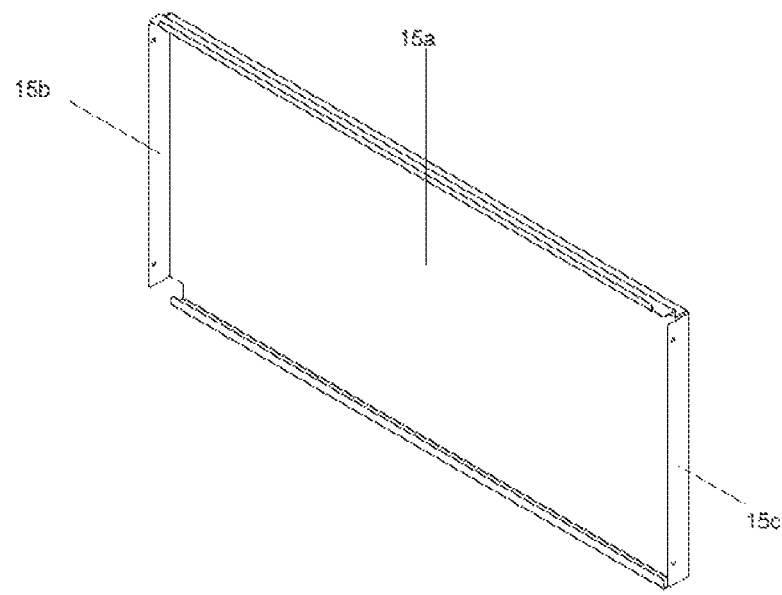
FIG. 15 illustrates the view of the base of the cabinet.
Figure 16:
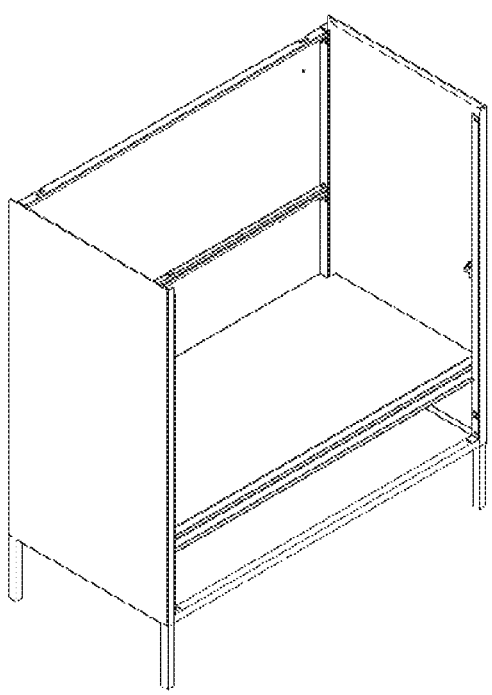
FIG. 16 illustrates the view of the sequence for mounting the cabinet base in the mounted assembly with the left and right sides, rear and front feet, and the lower and upper parts of the back section.
Figure 17:
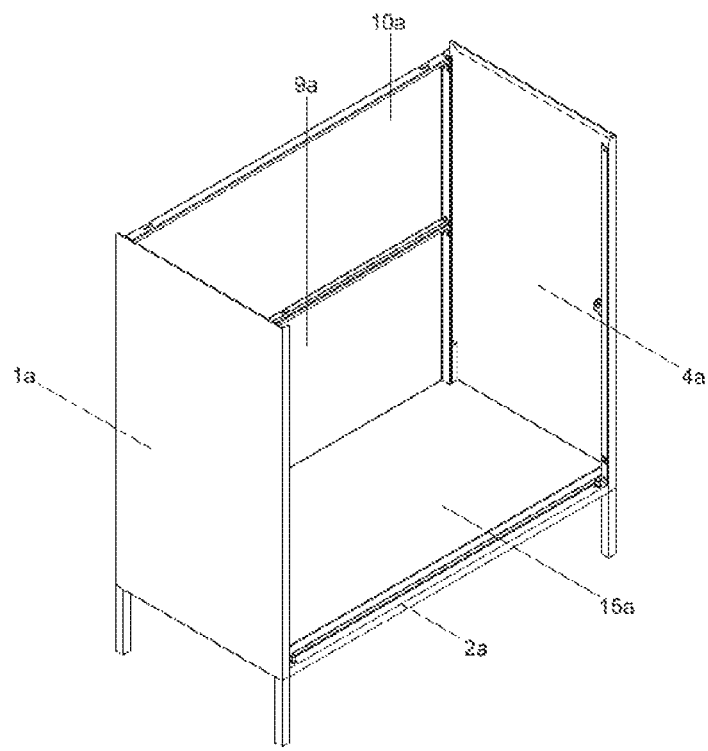
FIG. 17 illustrates the view of mounted assembly with the left and right sides, rear and front feet, and the lower and upper parts of the back section, and the base of the cabinet.

According to the FIGS. 15, 16, and 17, the base (15) of the cabinet presents 90° side L-shaped bends (15b and 15c) that are fitted to the 180° bends (1f and 4f) of the left (1a) and right (4a) sides, promoting full locking of the left and right sides mounted assembly, rear and front feet, and the lower and upper parts of the back section.

Figure 18:
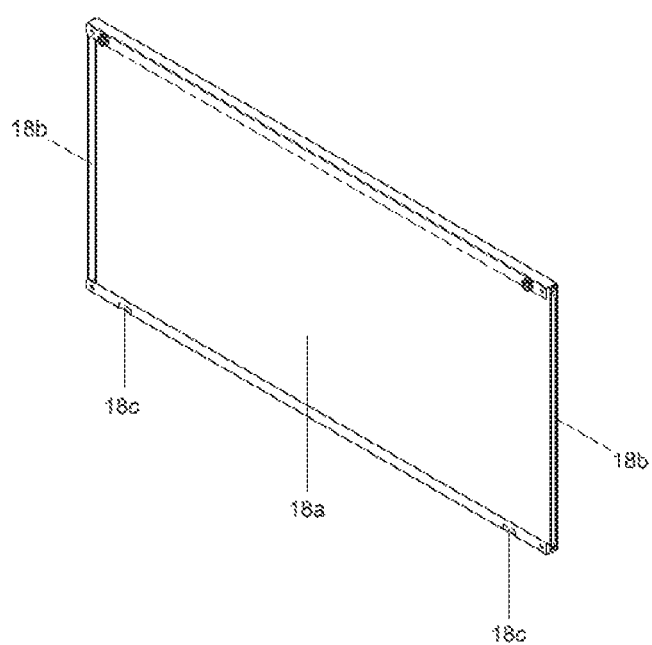
FIG. 18 illustrates the view of the top of the cabinet.
Figure 19:
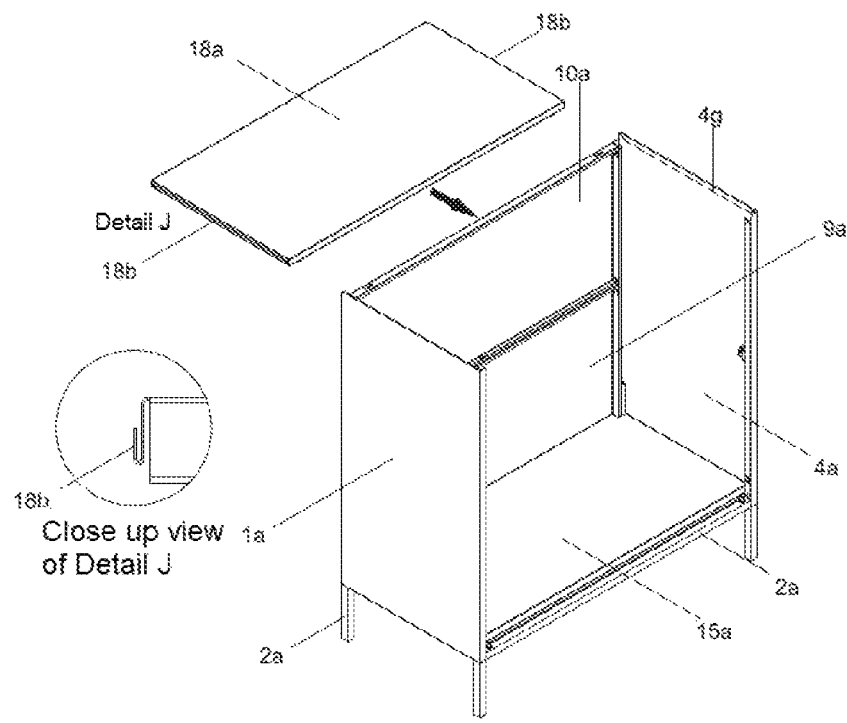
FIG. 19 illustrates the view of the sequence for mounting the top of the cabinet in the mounted assembly with left and right sides, rear and front feet, the lower and upper parts of the back section, and the base of the cabinet. The close-up view J illustrates the bend that fits the side parts and the top one to another.
Figure 20:
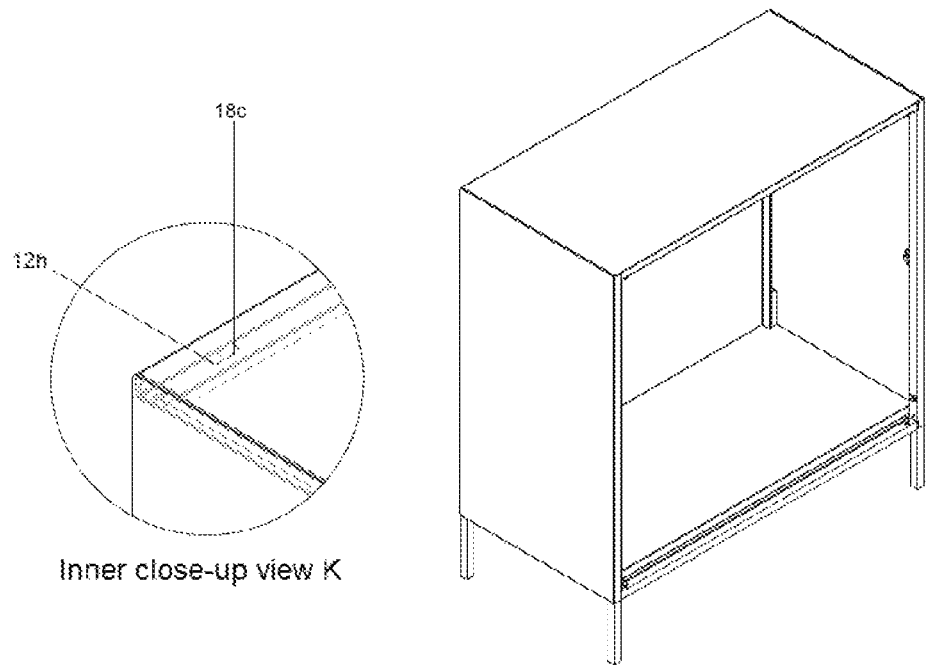
FIG. 20 illustrates the view of the mounted assembly with the left and right sides, rear and front feet, lower and upper parts of the back section, base of the cabinet, and the top of the cabinet. The inner close-up view K illustrates the locking between the top and the upper part of the back section.

According to the FIGS. 18, 19, and 20, the mounted assembly of the side sections, feet, and the lower and upper parts of the back section of the cabinet, and base (15) receives the cabinet top (18a) by slidingly fitting the 90° side L-shaped bends followed by the second 180° inverted bend (18b). The sliding occurs on the 180° upper bend (1g and 4g) of the left and right side sections, promoting full positioning and fitting to the assembly. The top is locked by manual bending the tabs (12h) positioned on the U-shaped bend of the upper part of the back section (12a) fitting to the hole (18c), finishing the locking of the cabinet pieces, thus forming the box of the cabinet with feet for receiving the shelf and the doors (not illustrated).

I claim:

1. A mounting system applied to a cabinet with feet comprising
    a left side (1a) comprising of U-shaped bends (1c), the U-shaped bends (1c) receiving a forward part of a left side (2b) of a double tubular rear feet (2a), the double tubular rear feet (2a) being of square sections welded in an H-shape, the forward part of the left side (2b) of the double tubular rear feet (2a) being fitted to the U-shaped bends (1c) of the left side (1a), the left side (1a) and the double tubular rear feet (2a) being locked by manually bending a tab (1b) of the left side (1a) on a hole (2c) of the double tubular rear feet (2a);
    a right side (4a) comprising U-shaped bends (4c), the U-shaped bends (4c) receiving a forward part of a right side (2b) of the double tubular rear feet (2a), the forward part of the right side (2b) of the double tubular rear feet (2a) being fitted to the U-shaped bends (4c) of the right side (4a), the right side (4a) and the double tubular rear feet (2a) being locked by manually bending a tab (4b) of the right side (4a) on a hole (2c) of the double tubular rear feet (2a);
    the left side (1a) receiving a forward part of a left side (2b) of a double tubular front feet (2a), the forward part of the left side (2b) of the double tubular front feet (2a) being fitted to the U-shaped bends (1c) of the left side (1a), the left side (1a) and the double tubular front feet (2a) being locked by manually bending a tab (1h) of the left side (1a) on a hole (2c) of the double tubular front feet (2a);
    the right side (4a) receiving a forward part of a right side (2b) of the double tubular front feet (2a), the forward part of the right side (2b) of the double tubular front feet (2a) being fitted to the U-shaped bends (4c) of the right side (4a), the right side (4a) and the double tubular front feet (2a) being locked by manually bending a tab (4h) of the right side (4a) on a hole (2c) of the double tubular front feet (2a), wherein after locking the tab (4h) on the hole (2c), the cabinet with feet is configured to be placed upright; and
    a lower part (9a) of a back section of the cabinet being fitted over one of the U-shaped bends (1c) of the left side (1a), one of the U-shaped bends (4c) of the right side (4a), and the double tubular rear feet (2a), the lower part (9a) being locked by manually bending tabs (9f and 9g) on holes (1e and 4e) of the left side (1a) and the right side (4a).

2. The mounting system applied to a cabinet with feet according to claim 1, further comprising an upper part (12a) of the back section of the cabinet being fitted over the one of the U-shaped bends (1c) of the left side (1a) and the one of the U-shaped bends (4c) of the right side (4a), the upper part (12a) of the back section of the cabinet being locked by manually bending tabs (12f and 12g) in holes (1d and 4d) of the left side (1a) and the right side (4a); wherein the upper part (12a) of the back section of the cabinet is locked to the lower part (9a) of the back section of the cabinet by manually bending a tab (12e) on a hole (9e) of the lower part (9a) of the back section of the cabinet.

3. The mounting system applied to a cabinet with feet, according to claim 2, comprising a base (15) comprising 90° side L-shaped bends (15b and 15c) which are fitted to 180° bends (1f and 4f) of the left side (1a) and the right side (4a), promoting full locking of the left side (1a), the right side (4a), the double tubular rear feet (2a), the double tubular front feet (2a), the lower part (9a) of the back section, and the upper part (12a) of the back section.

4. The mounting system applied to a cabinet with feet according to claim 3, comprising a cabinet top (18a) having 180° inverted bends (18b) slidingly fit with 180° upper bends (1g and 4g) of the left side (1a) and the right side (4a), promoting full positioning and fitting of the cabinet top (18a); wherein the cabinet top (18a) is locked by manually bending tabs (12h) of the upper part (12a) of the back section on holes (18c), the tabs (12h) formed on a U-shaped bend of the upper part (12a) of the back section, thereby forming a box of the cabinet with feet, the box configured to receive a shelf and doors.

5. A mounting system for a cabinet with feet comprising:
    a left side panel (1a) comprising a first U-shaped bend (1c) with a first tab (1b) in the first U-shaped bend (1c);
    a rear support structure (2a) welded in an H-shape comprising a first tubular foot and a second tubular foot, each said foot having a square cross-section and having a hole (2c) in an upper part of the foot (2b);
    wherein the upper part of the first tubular foot (2b) of the rear support structure is received within the first U-shaped bend (1c) of the left side panel (1a) such that the hole (2c) in the first tubular foot is aligned with the first tab (1b), and is locked in position by the first tab (1b) being bent into the hole (2c) in the first tubular foot;
    a right side panel (4a) comprising a first U-shaped bend (4c) with a second tab (4b) in the first U-shaped bend (4c);
    wherein the upper part of the second tubular foot (2b) of the rear support structure is received within the first U-shaped bend (4c) of the right side panel (4a) such that the hole (2c) in the second tubular foot (2b) is aligned with the second tab (4b), and is locked in position by the second tab (4b) being bent into the hole (2c) in the second tubular foot;

a front support structure welded in an H-shape comprising a first tubular foot and a second tubular foot (2a), each said foot having a square cross-section and having a hole (2c) in an upper part of the foot (2b);

wherein the left side panel (1a) comprises a second U-shaped bend (1c) with a third tab (1h) in the second U-shaped bend (1c);

wherein the upper part of the first tubular foot (2b) of the front support structure is received within the second U-shaped bend (1c) of the left side panel (1a) such that the hole (2c) in the first tubular foot (2b) of the front support structure is aligned with the third tab (1h), and is locked in position by the third tab (1h) being bent into the hole (2c) in the first tubular foot (2b) of the front support structure;

wherein the right side panel (4a) comprises a second U-shaped bend (4c) with a fourth tab (4h) in the second U-shaped bend (4c); and wherein the upper part of the second tubular foot (2b) of the front support structure is received within the second U-shaped bend (4c) of the right side panel (4a) such that the hole (2c) in the second tubular foot (2b) of the front support structure is aligned with the fourth tab (4h), and is locked in position by the fourth tab (4h) being bent into the hole (2c) in the second tubular foot (2b) of the front support structure; and a first back panel (9a) comprising a left tab (9f) on a left side of the first back panel and a right tab (9g) on a right side of the first back panel;

wherein the left side panel comprises a first hole (1e) on the first U-shaped bend (1c);

wherein the right side panel comprises a first hole (4e) on the first U-shaped bend (4c); and wherein the first back panel is disposed on the rear support structure between the left side panel and the right side panel such the left tab (9f) of the first back panel is aligned with the first hole (1e) in the first U-shaped bend (1c) of the left side panel (1a) and the right tab (9g) of the first back panel (9a) is aligned with the first hole (4e) in the first U-shaped bend (4c) of the right side panel (4a), the first back panel (9a) being locked in position by the left and right tabs (9f and 9g) being bent into the first holes (1e and 4e) of the first U-shaped bends of the left and right side panels, respectively.

6. The mounting system according to claim 5, further comprising:

a second back panel (12a) comprising a left tab (12f) on a left side of the second back panel, a right tab (12g) on a right side of the second back panel, and a bottom tab (12e) on a bottom side of the second back panel;

wherein the left side panel further comprises a second hole (1d) on the first U-shaped bend (1c);

wherein the right side panel further comprises a second hole (4d) on the first U-shaped bend (4c);

wherein the first back panel (9a) further comprises a hole (9e) on an upper side of the first back panel (9a); and wherein the second back panel (12a) is disposed on the upper side of the first back panel (9a) between the left side panel and the right side panel such that the left tab (12f) of the second back panel is aligned with the second hole (1d) in the first U-shaped bend (1c) of the left side panel (1a), the right tab (12g) of the second back panel (12a) is aligned with the second hole (4d) in the first U-shaped bend (4c) of the right side panel (4a), and the bottom tab (12e) on the bottom side of the second back panel (12a) is aligned with the hole (9e) on the upper side of the first back panel (9a), the second back panel (12a) being locked in position by the left and right tabs (12f and 12g) being bent into the second holes (1d and 4d) of the first U-shaped bends of the left and right side panels, respectively, and by the bottom tab (12e) being bent into the hole (9e) on the upper side of the first back panel (9a).

7. The mounting system according to claim 6, further comprising:

a base panel (15) comprising a first 90° side L-shaped bend (15b) on a left side of the base panel (15) and a second 90° side L-shaped bend (15c) on a right side of the base panel (15);

wherein the left side panel further comprises a 180° bend (1f) disposed on a bottom side of the left side panel between the first and second U-shaped bends (1c);

wherein the right side panel further comprises a 180° bend (4f) disposed on a bottom side of the right side panel between the first and second U-shaped bends (4c); and wherein the base panel is disposed over the rear and front support structures (2a) between the left and right side panels (1a and 4a) such that the first 90° side L-shaped bend (15b) on the left side of the base panel (15) is aligned with the 180° bend (1f) disposed on the bottom side of the left side panel and the second 90° side L-shaped bend (15c) on the right side of the base panel (15) is aligned with the 180° bend (4f) disposed on the bottom side of the right side panel, the base panel (15) being locked in position by the first and second 90° side L-shaped bends (15b and 15c) being received within the 180° bends (1f and 4f) disposed on the bottom sides of the left and right side panels (1a and 4a), respectively.

8. The mounting system according to claim 7, further comprising:

a top panel (18a) comprising a left J-shaped bend (18b) on a left side of the top panel (18a) and a right J-shaped bend (18b) on a right side of the top panel (18a), each of the left and right J-shaped bends (18b) having a 90° side L-shaped bend followed by a 180° inverted bend;

wherein the top panel (18a) further comprises a first hole and a second hole (18c) on a bottom surface of the top panel (18a);

wherein the second back panel (12a) further comprises a U-shaped bend disposed on an upper side of the second back panel (12a) with a first tab and a second tab (12h) in the U-shaped bend on the upper side of the second back panel (12a);

wherein the left side panel (1a) further comprises a 180° upper bend (1g) disposed on an upper side of the left side panel between the first and second U-shaped bends (1c);

wherein the right side panel (4a) further comprises a 180° upper bend (4g) disposed on an upper side of the right side panel between the first and second U-shaped bends (4c); and wherein the top panel is disposed between the left and right side panels (1a and 4a) such that the left J-shaped bend (18b) on the left side of the top panel (18a) is received with the 180° upper bend (1g) disposed on the upper side of the left side panel, the right J-shaped bend (18b) on the right side of the top panel (18a) is received with the 180° upper bend (4g) disposed on the upper side of the right side panel, and the first and second holes (18*c*) on the bottom surface of the top panel (18*a*) are aligned with the first and second tabs (12*h*) on the U-shaped bend disposed on the upper side of the second back panel (12*a*), respectively, the top panel (18*a*) being locked in position and forming a box of a cabinet with feet by the first and second tabs (12*h*) on the U-shaped bend disposed on the upper side of the second back panel (12*a*) being bent into the first and second holes (18*c*) on the bottom surface of the top panel (18*a*).

\* \* \* \* \*